United States Patent [19]
Bloomfield

[11] 3,982,962
[45] Sept. 28, 1976

[54] PRESSURIZED FUEL CELL POWER PLANT WITH STEAM POWERED COMPRESSOR

[75] Inventor: David P. Bloomfield, West Hartford, Conn.

[73] Assignee: United Technologies Corporation, Hartford, Conn.

[22] Filed: Feb. 12, 1975

[21] Appl. No.: 549,599

[52] U.S. Cl. .................................................. 429/19
[51] Int. Cl.² ........................................ H01M 8/06
[58] Field of Search ............. 136/86 A, 86 B, 86 C, 136/86 R

[56] References Cited
UNITED STATES PATENTS

| | | | |
|---|---|---|---|
| 668,838 | 2/1901 | Lavison | 136/86 A |
| 1,182,759 | 5/1916 | Emanuel | 136/86 R |
| 3,112,229 | 11/1963 | Bacon et al. | 136/86 R |
| 3,311,097 | 3/1967 | Mittelsteadt | 123/119 |
| 3,404,529 | 10/1968 | Lagerstrom | 60/6 |
| 3,507,702 | 7/1970 | Sanderson | 136/86 R |
| 3,615,850 | 10/1971 | Chludzinski | 136/86 C |

*Primary Examiner*—John H. Mack
*Assistant Examiner*—H. A. Feeley
*Attorney, Agent, or Firm*—Stephen E. Revis

[57] ABSTRACT

A fuel cell power plant for producing electricity uses pressurized air and fuel in the cells. A compressor is driven by a turbine operably connected thereto and provides compressed air to the cells. The turbine is driven by a working fluid in a hot, pressurized, vapor state. Energy to convert the working fluid into this state is waste energy produced by the power plant, such as stack waste heat. In one embodiment the power plant includes a steam reforming reactor and a reactor burner. Effluent gases from the anode side of the cell are used in the reactor burner. The working fluid is water and the turbine is driven by steam which is condensed to the liquid state after passing through the turbine. The liquid water is reconverted to steam by passing it into heat exchange relationship with the stack and it is then delivered again into the turbine. Part of the steam may be used in the steam reforming reactor. Preferably the effluent gases from the reactor burner and the effluent gases from the cathode side of the cells is delivered into an air turbine for generating electrical power in addition to the electrical power produced in the fuel cells.

12 Claims, 5 Drawing Figures

FIG. 4 STEAM REFORMER REACTOR PERFORMANCE

FIG. 3 FUEL CELL PERFORMANCE

FIG_5

PRESSURIZED FUEL CELL POWER PLANT WITH STEAM POWERED COMPRESSOR

BACKGROUND OF THE INVENTION

1. Field of the Invention

This invention relates to power plants and more particularly to electricity producing power plants utilizing fuel cells as the power source.

Description of the Prior Art

In the fuel cell art there have been three general approaches to improving fuel cell performance. One approach is to increase the temperature at which the fuel cell operates. This approach, however, is limited by material corrosion and, in acid electrolyte cells, by acid evaporation. A second approach is to attempt to increase the amount of catalyst per square inch of electrode surface area. This approach, however, is limited by the increased expense and practical limitations in the amount of catalyst that can possibly be put on a certain area of electrode. A third approach is to increase the pressure of the reactants within the fuel cell. It is well known in the art that fuel cells perform better as reactant pressures increase. One of the major stumbling blocks to this approach is that it requires considerable energy to pressurize the reactants. It has been considered, for example, that the energy to pressurize reactants should be the electrical energy produced by the fuel cell; that electrical energy would be used to drive a compressor. The problem is that it takes about 30% of the electrical output of the cell stack to drive a compressor to produce a reasonable reactant pressure. This means that the fuel cell would have to be increased in size by about 50% to make up for the loss of usable electrical power. Since a fuel cell stack is itself the most expensive component of a fuel cell power plant, the increase in performance is offset by the increased cost due to increased cell size. Because total electrical power output of the cell stack is increased, other components of the power plant will have to be increased proportionately such as the condensing apparatus and the fuel conditioning apparatus. This further increases size and cost of the power plant. Further, other apparent disadvantages in the power plant system utilizing high pressure reactants are the cost of additional equipment to pressurize the reactants, the necessity for more expensive sealing arrangements, and the additional cost due to the necessity of utilizing stronger components to contain the higher pressures. In view of the foregoing considerations, with regard to power plants utilizing air as the oxidant, it has always been considered that no net advantage could be achieved, and most likely, there would be a net disadvantage in going to power plants utilizing high pressure reactants in the fuel cell stack. For the foregoing reasons, up to the present time, these fuel cell power plants have always used reactants at atmospheric pressures.

RELATED APPLICATIONS

The following applications, filed on even date herewith and of common assignee, pertain to subject matter related to the present invention:

1. "Pressurized Fuel Cell Power Plant" by D. Bloomfield and R. Cohen, U.S. Ser. No. 549,600.

2. "Pressurized Fuel Cell Power Plant" by D. Bloomfield, U.S. Serial No. 549,601.

3. "Pressurized Fuel Cell Power Plant With Air Bypass" by M. Landau, U.S. Ser. No. 549,598.

4. "Pressurized Fuel Cell Power Plant" by M. Menard, U.S. Ser. No. 549,597.

5. "Pressurized Fuel Cell Power Plant With Single Reactant Gas Stream" by D. Bloomfield, U.S. Ser. No. 549,602.

6. "Pressurized Fuel Cell Power Plant With Steam Flow Through The Cells" by D. Bloomfield and M. Landau, U.S. Ser. No. 549,596.

SUMMARY OF THE INVENTION

One object of the present invention is an economically attractive fuel cell power plant which operates on pressurized reactants.

Another object of the present invention is a more efficient fuel cell power plant.

Accordingly, the present invention is an electricity generating power plant using fuel cells wherein air is supplied to the fuel cells under pressure from a compressor which is driven by a hot pressurized vapor produced, at least in part, by waste heat from the fuel cell stack. In one embodiment a steam driven turbine is operably connected to a compressor which delivers pressurized air to the cathode side of a fuel cell. The turbine is driven by steam generated by circulating water in heat exchange relationship with the fuel cells. The water may either be recovered from the stack effluent gases or may be supplied from a separate source.

Also, since the electrical output from the cell stack is not used to pressurize the air, there is no need to increase the size of the fuel cell stack in order to maintain power plant capacity. Thus, full advantage can be taken of the performance improvement in the fuel cell stack such that the stack may produce even more electrical energy without an increase in its size.

Furthermore, other heretofore unrecognized benefits arise throughout the power plant to further enhance the attractiveness of a fuel cell power plant designed according to the present invention. For example, one advantage of the present invention is that it permits a reduction in the size of the water recovery apparatus of the power plant by a significant amount due to the lower dew point of the pressurized gases. This is particularly significant since the condensing apparatus of prior art fuel cell power plants occupies a volume about as large as the fuel cell stack and fuel conditioning apparatus combined.

Another advantage of the present invention is that it permits a reduction in the size of the steam reforming reactor (if one is used) of the power plant by a factor of about two as compared to the steam reforming reactor used in a prior art unpressurized fuel cell power plant of similar capacity.

The foregoing and other objects, features and advantages of the present invention will be more fully explained and will become more apparent in the light of the following detailed description of the preferred embodiments thereof as illustrated in the accompanying drawing.

DESCRIPTION OF THE PREFERRED EMBODIMENTS

Figure 1:
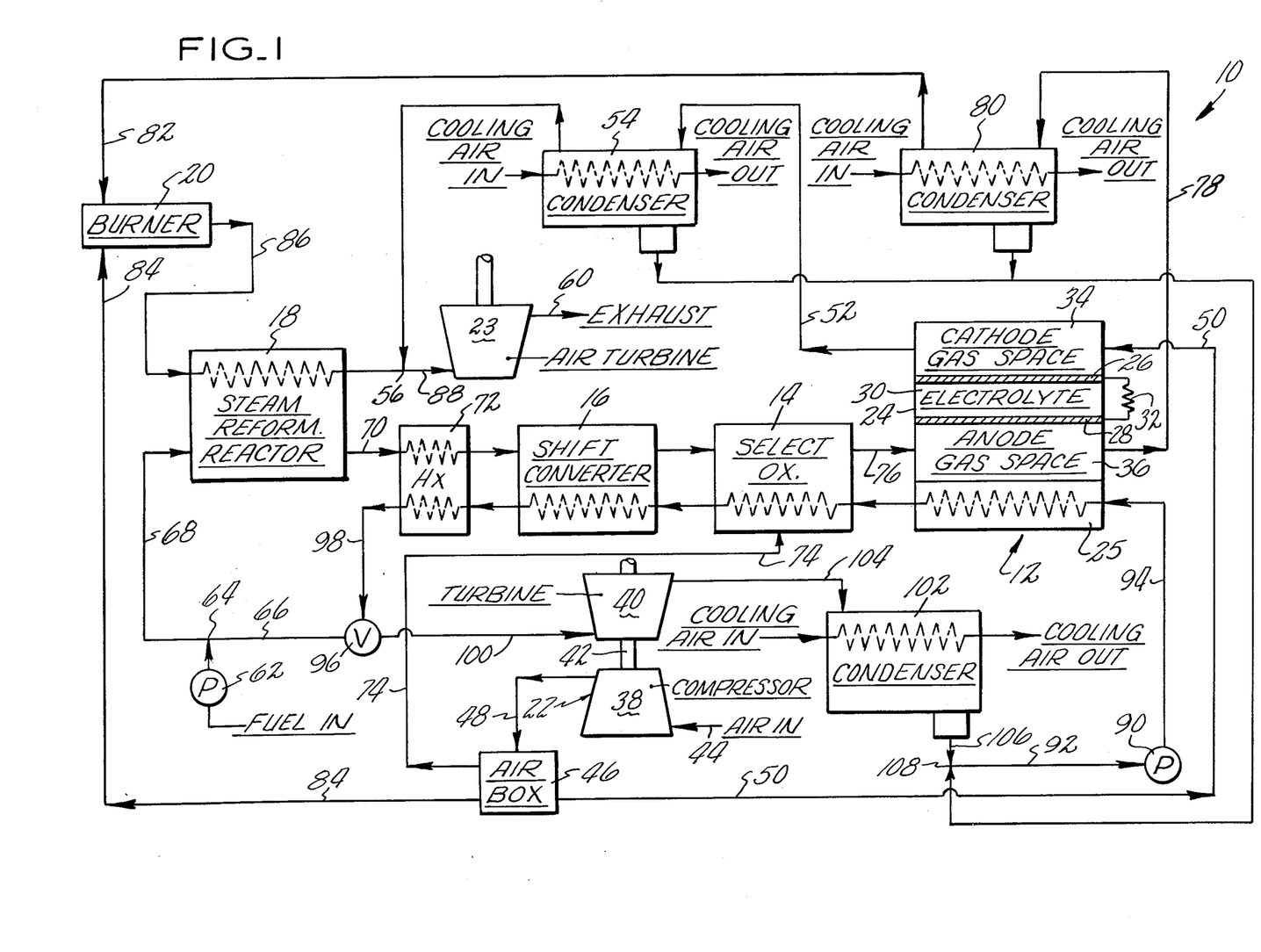
FIGS. 1 and 2 are schematic representations of power plants according to the present invention.

Consider, as an exemplary embodiment of the present invention, the power plant depicted schematically in FIG. 1 and generally designated by the numeral 10. The power plant 10 includes a fuel cell stack generally designated by the numeral 12. The stack 12 may comprise any conventional type of fuel cells which operate on gaseous reactants. In this embodiment the oxidant is air and the fuel is hydrogen. Also included in the power plant 10 is fuel conditioning apparatus comprising a selective oxidizer 14, a shift converter 16, a steam reforming reactor 18, and a reactor burner 20 for providing heat to the steam reforming reactor. The power plant also comprises compressor apparatus generally designated by the numeral 22, an air turbine 23, and various pumps, controls, heat exchangers and condensers which will be hereinafter described in connection with the operation of the power plant 10.

The stack 12 will generally comprise a plurality of fuel cells connected in series electrically through a load, but is herein depicted as only comprising a single cell 24 for the purpose of clarity and a thermal management portion 25. As herein shown each cell includes a cathode electrode 26 spaced from an anode electrode 28 and including an electrolyte retaining matrix 30 therebetween. In this preferred embodiment the electrolyte is liquid phosphoric acid but the invention is not intended to be limited thereto and base electrolytes as well as solid types of electrolytes such as metal oxide electrolytes or solid polymer electrolytes are contemplated as being useful in a power plant designed according to the present invention. The electrodes 26, 28 are connected in series through a load 32. Each cell 24 also includes a cathode gas space 34 on the nonelectrolyte side of the cathode electrode 26 and an anode gas space 36 on the nonelectrolyte side of the anode electrode 28. The compressor apparatus 22 comprises a compressor 38 driven by a steam turbine 40 through a shaft 42.

Still referring to FIG. 1, in operation air enters the compressor 38 via a conduit 44 and is compressed. Any pressure greater than atmospheric pressure will yield some benefits as compared to unpressurized power plants; however, about two or higher atmospheres of pressure are desirable in order that substantial benefits are realized for the total power plant. This pressurized air enters an air control box or air splitter 46 via a conduit 48. The air box includes controls and valves for properly proportioning the air flow to various components. A portion of the air leaves the air box 46 via a conduit 50 and is delivered into the cathode gas space 34. As it travels through the cathode gas space 34, the oxygen in the air is electrochemically reacted within the cathode electrode 26 with the phosphoric acid electrolyte in the matrix to produce electricity and water, some of the water being evaporated back into the air stream flowing through the cathode gas space 34. The moist cathode effluent leaves the gas space 34 via a conduit 52, passes through a condenser 54 (the function of which will be hereinafter explained), is combined with effluent gases from the burner 20 at 56, and is delivered into the air turbine 23. The spent gases are exhausted from the turbine 23 via a conduit 60.

On the anode side, a hydrogen containing liquid fuel such as naphtha, which has been increased in pressure by a pump 62 to about the same pressure of the air entering the cathode gas space 34, is mixed with pressurized steam at 64 which is flowing in a conduit 66 (as will hereinafter be explained) and is delivered therewith into the steam reforming reactor 18 via a conduit 68. Although not shown, it is preferable that the fuel be atomized as it is combined with the steam at 64 so that the stream entering the reactor 18 is in the vapor state. Although in this embodiment a liquid fuel is used so that it may easily and with relatively little energy be pumped up to pressure, if a pressurized supply of gaseous fuel such as methane happens to be available, it may be used.

Partially processed fuel leaves the reactor 18 by means of a conduit 70, gives up some of its heat in a regenerative heat exchanger 72, and enters the shift converter 16 to reduce the carbon monoxide content of the gas stream leaving the reactor 18. In the shift converter carbon monoxide plus water combine in the presence of a catalyst to form hydrogen and carbon dioxide plus heat according to the well known equation as follows:

$$CO + H_2O \rightarrow H_2 + CO_2 + \text{heat} \qquad (1)$$

From the shift converter 16 the gases pass into the selective oxidizer 14 to even further reduce the carbon monoxide content of the gases. In the selective oxidizer carbon monoxide reacts with air delivered from the air box 46 via a conduit 74 to produce carbon dioxide plus heat according to the well known equation as follows:

$$CO + \tfrac{1}{2} O_2 \rightarrow CO_2 + \text{heat} \qquad (2)$$

Although the fuel conditioning apparatus is shown comprising a shift converter and a selective oxidizer in addition to a steam reforming reactor and reactor burner, it is contemplated that fuel conditioning apparatus of power plants designed according to the present invention may nor require a shift converter or selective oxidizer or may require other components in addition to those shown. The requirements of the fuel conditioning apparatus are dependent in part upon the type of unprocessed fuel being used and upon the particular design of the cells in the fuel cell stack. Indeed, the fuel conditioning apparatus may include a partial oxidation hydrogen generator instead of a steam reforming reactor and reactor burner.

Processed fuel leaves the selective oxidizer 14 via a conduit 76 whereupon it enters the anode gas space 36 of the fuel cell 24 where it electrochemically reacts with the electrolyte. In this embodiment the anode gas stream is contemplated as being at about the same pressure as the cathode gas stream in order to minimize the risk of gas crossover between the anode and cathode gas spaces. The anode effluent gas stream leaves the anode gas space 36 by means of a conduit 78, passes through a condenser 80 wherein water is recovered therefrom, and is then fed into the reactor burner 20 via a conduit 82 along with compressed air from the air box 46 via a conduit 84. The anode gas stream effluent contains enough unburned hydrogen gas such that there is no need for the burner 20 to have a separate fuel supply. However, if desired, the anode gas stream effluent may bypass the burner 20 and the burner 20 may be provided with its own separate fuel supply or may be run on a portion of the processed fuel leaving the selective oxidizer 14. Heat for the steam reforming reactor 18 is provided by the burner 20 by passing the effluent gases therefrom into heat exchange relationship with the steam reforming reactor via a conduit 86. The burner exhaust products, which include the anode gas stream effluent, are then combined at 56 with the effluent from the cathode gas space 34 and pass together therewith into the air turbine 23 via a conduit 88. The air turbine 23 is simply a means for using some of the energy of the effluent gases. For example, the air turbine might be used to drive an electrical generator thus supplementing the output of the stack using energy that might otherwise be wasted. The air turbine 23 also serves the purpose of maintaining a back pressure in the power plant which is required in this invention; however, any means for maintaining the back pressure, such as a throttle valve, may be used instead of the air turbine.

The energy to drive the compressor apparatus 22 which compresses the air used in the stack 12 is waste heat from the stack 12 and from the fuel conditioning apparatus. This is accomplished using the well known Rankine cycle, such as is described in section 18.2, pp. 449–551 of "Thermodynamics of Engineering Science" by S. L. Soo, Prentiss-Hall Inc., Englewood Cliffs, N. J. 1957.

As shown in FIG. 1, water is delivered into a pump 90 via a conduit 92 and is delivered into thermal exchange relationship with the stack 12 via a conduit 94 by passing the water through the thermal exchange portion 25 of the stack 12. Part of the water is changed to steam as it passes through the stack 12. The water and steam is then superheated by passing it into heat exchange relationship with the fuel conditioning apparatus. As shown it picks up heat from the selective oxidizer 14 and the shift converter 16; it is further heated in the heat exchanger 72 by the gases leaving the steam reforming reactor 18. The superheated steam leaves the heat exchanger 72 and is delivered to a valve 96 via a conduit 98. The valve 96 permits the amount of steam necessary for the steam reforming reactor 18 to pass into the conduit 66 whereupon it mixes with unprocessed fuel at 64 as hereinabove explained. The remainder of the superheated steam is delivered into the turbine 40 via a conduit 100. The turbine drives the compressor 38 for compressing the air for the stack 12. In this embodiment the turbine 40 is a steam driven turbine; however, any steam driven engine operably connected to run a compressor may be used.

The exhaust from the turbine 40 is delivered into a condenser 102 via a conduit 104. Heat is removed from the stream by passing air through the condenser as shown. Liquid water, or possibly a mixture of liquid water and steam, leaves the condenser 102 via a conduit 106 and is combined at 108 with water recovered from the anode and cathode effluent gas streams in the condensers 54, 80. The water is then delivered to the pump 90 via the conduit 92 and the process starts again. Note that the Rankine cycle loop has the multipurpose of producing steam for the steam reforming reactor, compressing the air used in the fuel cells, and cooling the fuel cell stack. Because the present invention is dependent upon stack waste heat for driving a compressor, it is particularly suitable for cell stacks which operate at high temperatures. The higher the temperature the greater amount of superheat will be available for the Rankine cycle working fluid. The only water lost in the Rankine cycle loop is in the steam provided to the steam reforming reactor 18. It is this amount of water which is recovered in the condensers 54, 80 and which is combined at 108 with the water which recirculates through the loop. If a separate water supply is available then the water recovery apparatus, which are the condensers 54, 80, would not be necessary.

Figure 2:
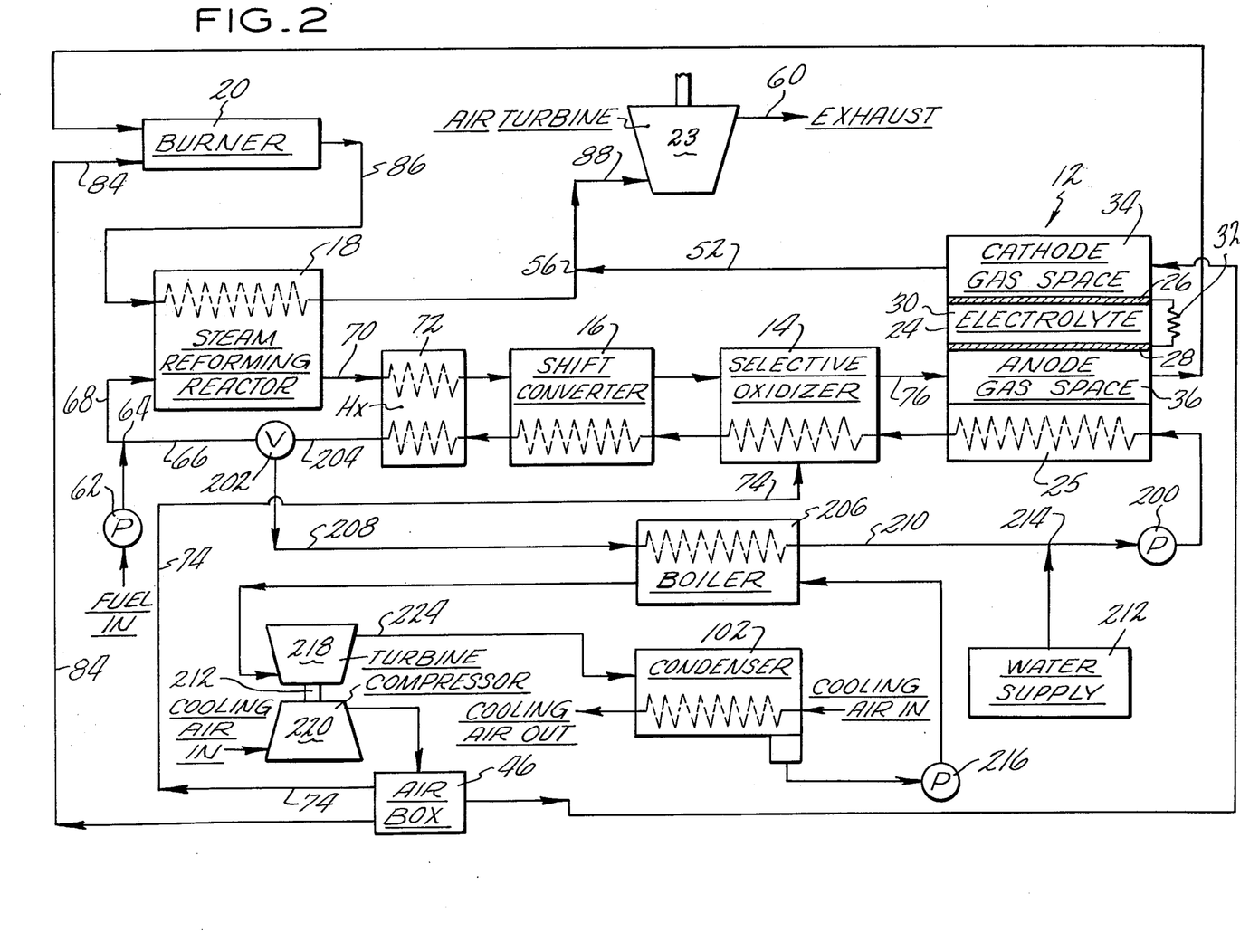

An alternate embodiment of the present invention is shown in FIG. 2. Components which are the same as those in FIG. 1 have been given the same reference numerals. The major differences between this embodiment and the embodiment of FIG. 1 are that the working fluid for the Rankine cycle is not necessarily water, and the stack 12 is provided with a separate cooling loop which also serves to generate steam for the steam reforming reactor 18.

Liquid water is pumped through the thermal exchange portion 25 of the stack 12 by a pump 200. Waste heat from the stack is transferred to the water and converts at least a portion of the water to steam. As in the first embodiment the steam is superheated by waste heat from the selective oxidizer, shift converter, and steam reforming reactor effluent heat. Superheated steam is delivered from the heat exchanger 72 to a valve 202 via a conduit 204. The valve 202 permits the proper amount of steam to be delivered to the steam reforming reactor via a conduit 66; the remainder of the steam passes into a boiler 206 via a conduit 208. The heat from the steam is transferred to and boils the Rankine cycle fluid which passes through the boiler 206. The cooled effluent from the boiler 206 is delivered to the pump 200 via a conduit 210 and is recirculated through the stack 12. Water from a water supply 212 is added at 214 to make up for the steam delivered to the steam reforming reactor 18.

Referring now to the Rankine cycle portion of the power plant shown in FIG. 2, the working fluid is pumped around the system by a pump 216. The working fluid may be, for example, trichlorotrifluoroethane, commonly known as Refrigerant No. 113, but any fluid having suitable vapor pressure and temperature characteristics may be employed. The fluid passes into the boiler 206 and is converted there into a vapor state. The vapor passes into and drives a turbine 218 which is operably connected to and drives a compressor 220 via a shaft 222. Although a turbine 218 is shown in the drawing, any vapor driven engine operably connected to run a compressor may be used. The effluent from the turbine 218 is delivered into a condenser 102 via a conduit 224, is converted back to the liquid state, and is recirculated via the pump 216.

Although this embodiment is different from the embodiment of FIG. 1 in many respects, it is important to note that the energy for the Rankin cycle is still provided by waste heat from the stack 12 and the fuel conditioning apparatus. Also, note that in this embodiment no water recovery from the fuel cell effluent gases is required since a separate water supply 212 is available to make up for the water used in the reactor 18; this arrangement could also have been used in the embodiment of FIG. 1.

Figure 3:
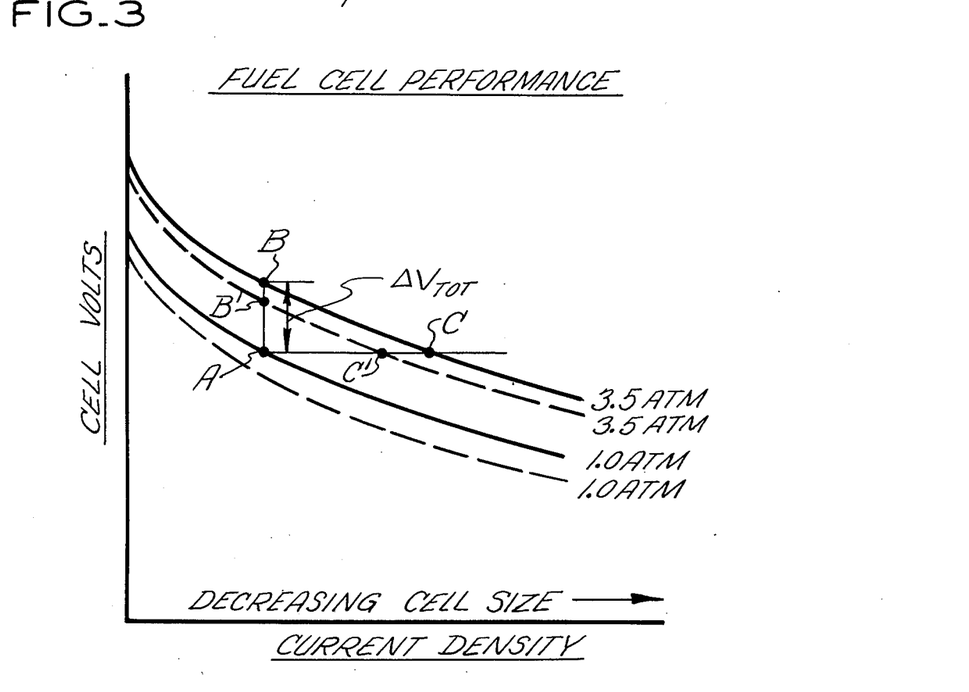
FIG. 3 is a graph illustrating the performance of fuel cells used in power plants of the present invention.

In order to more fully appreciate and understand the advantages of a fuel cell power plant which uses pressurized reactants, consider the graph of FIG. 3 which may be used to compare the performance of a fuel cell using reactants at atmospheric pressure to the performance of the same fuel cell using, for example, reactants at about 3.5 atmospheres of total pressure. There are several variables which must be taken into consideration when making comparisons between cells. Reactant utilization is the weight flow rate of reactants at either the anode or the cathode which is consumed in the cell by the electrochemical reaction divided by the weight flow rate of hydrogen or oxygen, respectively, into the cell. In a fuel cell operating on oxygen and hydrogen there is thus oxygen utilization ($U_{O_2}$) at the cathode and hydrogen utilization ($U_{H_2}$) at the anode. Raising reactant utilization automatically lowers the partial pressure of the reactants seen by the anode and the cathode since more reactants are taken out of the gas stream per pound of mass flow through the cell; thus, the average amount of reactant in the gas stream over the surface of the electrode is less from the inlet to the outlet. The curve labeled 1.0 atmosphere in FIG. 3 represents cell performance at a particular hydrogen utilization and oxygen utilization. The solid curve labeled 3.5 atmospheres represents cell performance at the same reactant utilization ratio. Also, the cells represented by each of these curves is assumed to be operating at the same temperature. The well known Tafel equation states that there will be an increase in cathode performance (i.e., an increase in voltage) when the partial pressure of oxygen increases. This equation is set forth below.

$$\Delta V_{cathode} = K(mv) \log \left[ \frac{P_{O_2}}{P_{O_2 (ref)}} \right] \quad (3)$$

where $K$ is a constant. The Nernst equation states that there will be an increase in anode performance (i.e., an increase in cell voltage) when the partial pressure of hydrogen is increased. The Nernst equation is set forth below.

$$\Delta V_{anode} = C(mv) \ln \left[ \frac{P_{H_2}}{P_{H_2 (ref)}} \right] \quad (4)$$

where $C$ is a constant. It is apparent that for constant temperature and for constant utilization, an increased in the total pressure of the reactants results in an increase in the partial pressure of both reactants leading to an improvement in both cathode and anode performance. The total improvement in fuel cell performance may be simply stated as follows:

$$\Delta V_{total} = \Delta V_{cathode} + \Delta V_{anode} \quad (5)$$

The left hand side of equation (5) is illustrated by the graph of FIG. 3 as the difference in voltage between points A and B at constant current density. Further, from the graph of FIG. 3, it can be seen that by operating at reactant pressures of 3.5 atmospheres the cell size may be decreased without decreasing the cell voltage output such as by operating at point C.

The dotted curves on the graph of FIG. 3 are also representative of cell performance at 1.0 and 3.5 atmospheres of reactant pressure, respectively, as labeled. These curves represent the performance of cells similar in all respects to cells represented by the solid curves except that the cells have been designed for higher reactant utilization. Note that at 3.5 atmospheres the cell can run at a higher reactant utilization and still show improvement over the prior art such as an increase in cell voltage by operating at point B' or an increase in current density (i.e., a decrease in cell size) for the same cell voltage by operating at point C'. On the other hand, notice that for a cell using reactants at atmospheric pressure an increase in utilization means either increasing the size of the cell to maintain the same cell voltage or taking a voltage loss in order to maintain the same cell size. The importance of the ability to operate at higher hydrogen utilization without sacrificing performance or increasing the size of the cell will become apparent in the hereinafter set forth discussion relating to the operation of the steam reformer reactor 18 of the power plants of the preferred embodiments.

In prior art phosphoric acid electrolyte fuel cells operating over 300°F and at atmospheric pressures evaporation of the phosphoric acid electrolyte occurs. The effect of acid evaporation is to require that acid be added regularly during the lifetime of the power plant. Acid evaporation is a function of the mass flow rate of air through the cathode gas space, the partial pressure of acid, and the total gas pressure in the cathode gas space according to the following relationship:

$$\text{Acid loss} = f \left\{ \text{flow rate} \times \frac{\text{vapor pressure of acid}}{\text{total pressure}} \right\} \quad (6)$$

From the foregoing formula it is apparent that increasing the total pressure of the gases flowing through the cathode gas space reduces acid loss. It is also a fact that increasing the total pressure results in a decrease in the vapor pressure of the acid due to dilution of the electrolyte, further reducing acid loss. Also, due to the higher reactant pressures fuel cells incorporated in power plants of the present invention may be run at higher oxygen utilizations, and therefore the flow rate of air through the cathode gas space is lower and acid loss is further reduced. It has been determined that the foregoing factors combined reduce acid loss by an order of magnitude.

Figure 4:
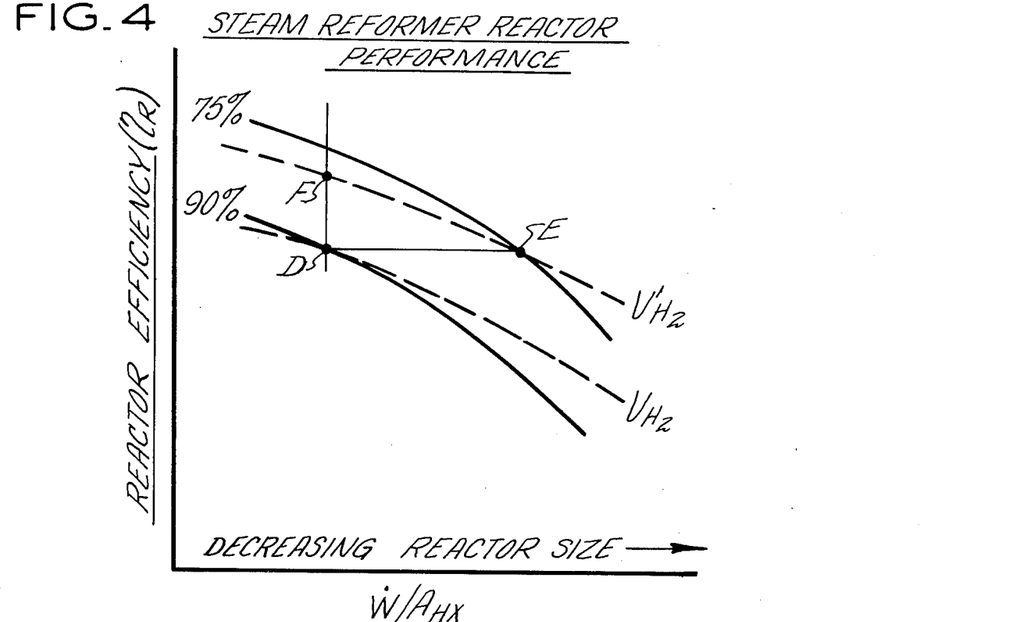
FIG. 4 is a graph illustrating the performance of steam reforming reactors used in power plants of the present invention.

A graph representative of a steam reformer reactor performance is shown in FIG. 4. Reformer efficiency ($\eta_R$) is plotted on the vertical axis and the flow rate of the processed gas stream ($\dot{W}$) divided by the heat transfer area of the reactor ($A_{hx}$) is plotted on the horizontal axis. Since the term $A_{hx}$ is directly related to the size of the reactor, reformer size decreases when moving to the right along the horizontal axis. Reformer efficiency is defined by the following equation:

$$\eta_R = (K) U_{H_2} (\alpha \cdot \beta) \quad (7)$$

where $K$ is a constant, $U_{H_2}$ is hydrogen utilization in the fuel cell, and the product ($\alpha \cdot \beta$) is fuel conversion in the reactor. Fuel conversion ($\alpha \cdot \beta$) is the percent of carbon in the incoming fuel which is converted to $CO_2$. It is representative of the amount of hydrogen produced in the steam reforming reaction. Shown in the graph of FIG. 4 are 90% and 75% fuel conversion curves along with a hydrogen utilization curve labeled $U_{H_2}$ and a hydrogen utilization curve labeled $U'_{H_2}$, the latter representing a higher hydrogen utilization. For the purposes of comparison assume that $U_{H_2}$ is the same hydrogen utilization as represented by the solid curves in FIG. 3 and that $U'_{H_2}$ is the hydrogen utilization represented by the dotted curves of FIG. 3. As discussed with reference to FIG. 3, fuel cells using reactants at atmospheric pressure were constrained to operate at a particular hydrogen utilization $U_{H_2}$ in order to achieve a certain cell voltage for a particular cell size (i.e., such as operating at point A). Having chosen a particular hydrogen utilization it is thus required that the operation of the steam reformer reactor must be somewhere along the hydrogen utilization curve $U_{H_2}$. It is thus a matter of choosing the best combination of reformer efficiency and reformer size for the particular cell. Generally, in order to keep reformer size within reasonable limits, fuel conversion in prior art reactors is commonly around 90%. This would put the operation of the steam reformer reactor used with prior art fuel cells at point D. It now becomes clear why it is so important to be able to run the fuel cell at a higher hydrogen utilization. For example, in a power plant designed according to the present invention it is now possible to operate along the curve $U'_{H_2}$. This permits the use of a smaller steam reformer reactor without sacrificing efficiency because the reformer can be run at a lower fuel conversion. This operating point is labeled E in FIG. 4. Of course, if desired, reactor size can be kept the same and reformer efficiency can be greatly improved such as by operating at point F. It is important to note that although there is some loss in fuel cell performance when operating at higher utilizations (see FIG. 3) the fuel cell performance picture is still greatly improved; and, in addition, significant improvements can also be realized in the steam reformer reactor. This is contrary to prior art power plants wherein although a higher reactant utilization in the fuel cell could result in benefits for the steam reformer reactor, these benefits are offset by the detrimental effect on fuel cell performance.

With regard to designing a power plant according to the present invention, it will, of course, be necessary to trade off between seeking improvements in reactor performance and seeking improvements in fuel cell performance. Thus, the reactant utilization, cell size, cell output voltage, reactor size, reactor efficiency, and reactor fuel conversion rate are chosen depending upon the particular goals of the power plant being designed.

In the preferred embodiment it is contemplated that naphtha will be used as the fuel and that the steam reforming reactor 18 will be of the well known type which utilizes a nickel catalyst. The reactor could, however, be any conventional apparatus for generating hydrogen. For example, although less efficient that a steam reformer reactor, a partial oxidation hydrogen generator may be used and will benefit significantly by the higher reactant gas pressures. In certain instances fuel conditioning apparatus may not even be required, such as if pure hydrogen or methanol is available for use as fuel for the stack.

With regard to power plants designed according to FIG. 1 of the present invention, water recovery condensers 54, 80 considerably smaller than the water recovery apparatus of prior art fuel cell power plants may be used. At a constant current there is a constant amount of water produced by the fuel cell according to Faraday's law. This water leaves the cell in the cathode and anode effluent gas streams. The steam reforming reaction is known to require a certain amount of water which is obtained from the effluent gas streams. This water is recovered by condensers. In prior art phosphoric acid electrolyte power plants wherein the gas stream is at atmospheric pressure the dew point of the stream is so low that in order to condense out a sufficient amount of water to run the steam reformer reaction the temperature of the gas stream leaving the condenser must necessarily be only a few degrees higher than the ambient cooling air. Accordingly, very large condensers are required. As heretofore stated the condensers are the largest components of prior art fuel cell power plants. In pressurized power plants according to the present invention the dew point of the gas stream leaving the cathode gas space will be considerably higher than in the prior art due to the higher pressure of the gas stream. For example, the dew point of a gas stream leaving a 300°F stack at 45 psia would be about 60°F higher than the dew point of a gas stream leaving a 300°F stack at atmospheric pressure. This means that to condense out the same amount of water the temperature of the gas stream need not be reduced to as low a level as in unpressurized systems. In other words there will be significant difference between the temperature of the condenser cooling air and the temperature of the gas stream leaving the condenser. Assuming the pressurized and unpressurized systems both use 90°F cooling air, it is estimated that the condenser size may be reduced by a factor of about two or three. This reduction in size of the water recovery apparatus is one of the advantages of the present invention and helps to significantly reduce the cost of the power plant.

Figure 5:
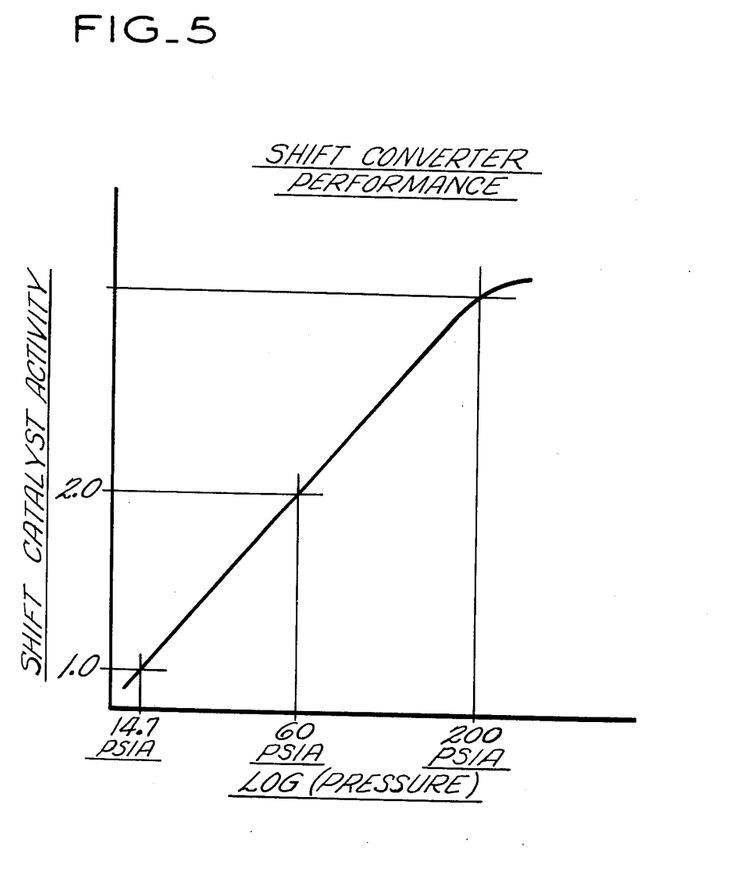
FIG. 5 is a graph showing shift converter performance at various pressures.

Refer now to FIG. 5 which is a graph of shift converter performance at constant gas stream temperature. The graph shows that there is a direct relationship between the performance of the shift converter and the pressure of the process gases flowing through the shift converter. Thus, when operating at higher gas pressures, there is an increase in catalyst activity which may be translated into a decrease in shift converter size or, in the alternative, more complete shifting for the same size shift converter. It can readily be seen that the shift catalyst activity doubles when the pressure of the gases flowing therethrough is increased from atmospheric pressure to about 60 psia. This improved shift converter performance is another advantage of being able to operate the fuel cell stack at high reactant gas pressures according to the present invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A power plant for generating electricity comprising:
   a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
   a compressor;
   turbine means for expanding a hot pressurized gaseous medium, said turbine means being operably connected to said compressor for driving said compressor to compress air to greater than 2 atmospheres pressure;

means for delivering air at a pressure of at least two atmospheres from said compressor into said cathode gas space;

fuel conditioning apparatus including reactor means for producing hydrogen from a hydrogen containing fuel;

burner means for providing heat to said reactor means;

means for delivering anode effluent gases into said burner means for providing fuel to said burner means;

means for delivering pressurized hydrogen containing fuel into said reactor means;

means for delivering pressurized hydrogen from said fuel conditioning apparatus into said anode gas space;

back pressure means operably associated with said stack for maintaining the pressure of said gases within said stack;

a working fluid;

means for transferring heat produced by said stack to said working fluid for converting said fluid into a hot, pressurized gaseous state;

means for delivering said working fluid in its hot, pressurized gaseous state into said turbine means for driving said compressor;

condenser means;

means for delivering the working fluid exhausted from said turbine means into said condenser means for converting said fluid to the liquid state; and means for returning said working fluid from said condenser means to said means for transferring heat thereto.

2. The power plant according to claim 1 wherein said working fluid is water.

3. The power plant according to claim 2 wherein said means for transferring heat from said stack to said working fluid includes means for delivering said working fluid into heat exchange relationship with said stack for converting at least a portion thereof into steam, and wherein said means for delivering said working fluid in its gaseous state into said turbine means includes means for delivering said steam into said turbine means.

4. The power plant according to claim 1 wherein said working fluid is water and wherein said means for transferring heat from said stack to said working fluid includes means for delivering said working fluid into heat exchange relationship with said stack for converting at least a portion thereof into steam, wherein said means for delivering said working fluid in its gaseous state into said turbine means includes means for delivering said steam into said turbine means, said power plant also including means for delivering a portion of said steam into said reactor means.

5. The power plant according to claim 1 wherein said back pressure means comprises an air turbine disposed downstream of said burner means for generating additional electrical energy, said power plant including means for delivering said cathode gas space effluent gases and said burner means effluent gases into said air turbine.

6. The power plant according to claim 1 wherein said means for transferring heat includes boiler means and said means for delivering said working means for transferring heat includes means for delivering said fluid from said condenser means into said boiler means, said means for transferring heat also including means for delivering water into heat exchange relationship with said stack for converting said water to steam and means for delivering said steam into said boiler means for transferring heat from said steam to said working fluid.

7. The power plant according to claim 6 wherein said reactor means is a steam reforming reactor, said power plant including means for delivering at least a portion of said steam into said steam reforming reactor.

8. The power plant according to claim 6 wherein said fuel conditioning apparatus is in heat exchange relationship with the steam generated by heat from the stack to superheat said steam.

9. The power plant according to claim 2 wherein said fuel conditioning apparatus is in heat exchange relationship with said working fluid for adding additional heat to said working fluid.

10. The power plant according to claim 4 wherein said reactor means is a steam reforming reactor.

11. The power plant according to claim 10 wherein said fuel conditioning apparatus is in heat exchange relationship with said working fluid for adding additional heat to said working fluid.

12. The power plant according to claim 10 including water recovery means and means for delivering cathode gas space effluent gases and anode gas space effluent gases into said water recovery means for removing water therefrom, and means for combining said removed water with said working fluid to replace the water delivered into said steam reforming reactor in the form of steam.

* * * * *